US008332850B2

(12) United States Patent
Theurer

(10) Patent No.: US 8,332,850 B2
(45) Date of Patent: Dec. 11, 2012

(54) THREAD STARVATION PROFILER BY UTILIZING A SET OF COUNTERS

(75) Inventor: Andrew Matthew Theurer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1308 days.

(21) Appl. No.: 12/047,751

(22) Filed: Mar. 13, 2008

(65) Prior Publication Data

US 2008/0155234 A1    Jun. 26, 2008

Related U.S. Application Data

(63) Continuation of application No. 10/912,492, filed on Aug. 5, 2004, now abandoned.

(51) Int. Cl.
*G06F 9/46* (2006.01)
*G06F 9/44* (2006.01)

(52) U.S. Cl. ......... 718/100; 718/104; 717/130; 717/131
(58) Field of Classification Search ........................ None
See application file for complete search history.

(56) References Cited

U.S. PATENT DOCUMENTS

| 4,393,470 A | | 7/1983 | Miard | |
| 4,432,051 A | * | 2/1984 | Bogaert et al. | 717/127 |
| 5,355,487 A | | 10/1994 | Keller et al. | 395/650 |
| 5,872,972 A | * | 2/1999 | Boland et al. | 718/102 |
| 6,002,872 A | | 12/1999 | Alexander, III et al. | 395/704 |
| 6,018,759 A | | 1/2000 | Doing et al. | |
| 6,076,157 A | | 6/2000 | Borkenhagen et al. | |
| 6,079,032 A | | 6/2000 | Peri | 714/38 |
| 6,126,329 A | | 10/2000 | Bennett et al. | 395/704 |
| 6,263,359 B1 | | 7/2001 | Fong et al. | |
| 6,341,371 B1 | | 1/2002 | Tandri | 717/5 |
| 6,473,820 B1 | | 10/2002 | Zhang | |
| 6,567,839 B1 | | 5/2003 | Borkenhagen et al. | |
| 6,625,635 B1 | | 9/2003 | Elnozahy | |
| 6,651,243 B1 | | 11/2003 | Berry et al. | 717/130 |
| 6,668,372 B1 | | 12/2003 | Wu | 717/130 |
| 6,728,955 B1 | | 4/2004 | Berry et al. | 717/158 |
| 7,020,878 B1 | | 3/2006 | Rhee et al. | |
| 2002/0099760 A1 | * | 7/2002 | Liang | 709/107 |
| 2003/0018680 A1 | * | 1/2003 | Iglesias et al. | 709/100 |
| 2003/0018691 A1 | | 1/2003 | Bono | |
| 2003/0214909 A1 | | 11/2003 | Maciel | |
| 2003/0236816 A1 | | 12/2003 | Venkatasubramanian | |
| 2004/0019891 A1 | * | 1/2004 | Koenen | 718/102 |
| 2004/0117796 A1 | * | 6/2004 | Dichter | 718/107 |

(Continued)

OTHER PUBLICATIONS

USPTO U.S. Appl. No. 10/912,492, May 1, 2012, 1 page.

*Primary Examiner* — Jennifer To
*Assistant Examiner* — Caroline H Arcos
(74) *Attorney, Agent, or Firm* — Francis Lammes; Stephen J. Walder, Jr.; Diana R. Gerhardt

(57) ABSTRACT

A profiler of a multithreaded process that determines whether a process is runnable but not running by determining whether a process is both waiting for the processor and also not waiting for other events such as I/O. Counters are maintained for each such process that is runnable but not running. Reports are generated summarizing data relating to any process that may be starved due to lack of processor time. Information obtained by the method and apparatus assists developers in optimizing resources in multithreaded environments.

11 Claims, 6 Drawing Sheets

U.S. PATENT DOCUMENTS

2005/0229176 A1 10/2005 Findeisen
2005/0240924 A1 10/2005 Jones et al.
2006/0031837 A1 2/2006 Theurer
2006/0037021 A1 2/2006 Anand et al.

* cited by examiner

| SAMPLES | PERCENTAGE | FUNCTION |
|---|---|---|
| 50 | 50% | FUNCTION_A |
| 25 | 25% | FUNCTION_B |
| 25 | 25% | FUNCTION_C |
| 100 | 100% | |

THREAD STARVATION PROFILER BY UTILIZING A SET OF COUNTERS

CROSS REFERENCE TO RELATED APPLICATIONS

The present application is a continuation application of pending U.S. patent application Ser. No. 10/912,492, which was filed on Aug. 5, 2004, which is assigned to the assignee of the present invention. The present application claims priority benefits to U.S. patent application Ser. No. 10/912,492.

TECHNICAL FIELD

The present invention relates to an improved data processing system and, in particular, to a method and apparatus for optimizing performance in a data processing system. Still more particularly, the present invention provides a method and apparatus for profiling multithreaded or multitasking processes to improve performance.

BACKGROUND INFORMATION

In analyzing and enhancing performance of a data processing system and the applications executing within, it is helpful to know which software modules are using system resources. Effective management and enhancement of data processing systems require knowing how and when various system resources are being used. Performance tools are used to monitor and examine resource consumption as various software applications are executing. For example, a performance tool may identify modules that execute most frequently, allocate the largest amount of memory, or perform the most I/O requests.

In analyzing and enhancing performance of a data processing system, a developer may focus on where time is being spent by the processor in executing software code. Such efforts are commonly known in the computer processing arts as locating "hot spots." Ideally, one would like to isolate such hot spots at the instruction level in order to focus attention on areas that might benefit most from improvements to the code.

For example, isolating such hot spots to the instruction level permits compiler writers to find significant areas of less than optimal code generation, at which they may focus their efforts to improve code generation efficiency. Another potential use of instruction level detail is to provide guidance to the designer of future systems. Such designers employ profiling tools to find threads, modules, functions, codepaths, characteristic code sequences, or single instructions that require optimization for a given hardware environment.

Multitasking can describe a processor or set of processors that operate on one process or subprocess before another is completed. The term "process" is sometimes used interchangeably with "task," "thread," and other such terms. A multitasking system splits time between processes depending on factors such as input/output (I/O) activity, interrupts, or the expiration of a fixed time interval. Threading can be a form of multitasking.

Threading can improve single-application performance by constantly feeding instructions to a single processor. For example, a single-threaded web server would be trapped in a wait state every time it fetched data from a disk. However, a multithreaded web server can handle new requests with one thread while another thread waits on the data from the disk. Multiple threads running on a processor can be analyzed to determine how much time a processor spends on each thread. Such a multithreaded arrangement improves performance by allowing the processor to operate continuously rather than wait for a slow process, such as I/O, to complete.

Process scheduling is the method by which the operating system determines which thread to run on the processor. Threads are sometimes assigned a class depending on the thread's priority. Threads running in a lower-priority class often only receive the processor time left over by higher-priority classes. Schedulers may allocate processor time to threads based on class and may interrupt a thread before the thread is complete. Schedulers may determine the order in which a thread should run and how much processor time each thread is allocated while running.

Sample-based profiling can describe a technique of periodically interrupting the operation of process execution at regular intervals. At each interruption, samples are taken to inform a developer which function was executing just before the interruption. After the interruption, normal processing is restarted. The interrupting and restarting of the process is looped for a predetermined length of time, for a predetermined number of events of interest, or upon an event such as user input.

At each time interval, the processor collects a sample that is then used to determine the function the processor is running. By sampling for many time intervals, a profiler can determine statistically on which functions a processor is spending its time. A profiler can then generate a report summarizing the sampled data.

An example profiler stops an application and samples the program counter of the currently executing thread. The profiler repeatedly stops the processor over many clock cycles to obtain a statistically meaningful quantity of data. The program counter values may be resolved against a load map and symbol table information for determining the function on which the processor is executing. The profiler increments a counter for the area of the particular area of code that is executing. Some profilers process information on the fly and create data structures representing an ongoing history of the runtime environment. Other profilers add data to a buffer or file for processing after sampling.

If profiling was carried out for 100 interrupts, a profile might indicate that the processor was running code from function A during 50 interrupts, the processor was running code from function B during 25 interrupts, and the processor was running code from function C during 25 interrupts. Such data would indicate to the developer that processor time was split among functions A, B, and C on a percentage basis of 50%, 25%, and 25%, respectively. If functions A, B, and C all were written to have equal distribution, the example profile would tend to indicate that functions B and C are not receiving enough processor time and function A is processor-bound, requiring too much processor time.

A sample-based profiler may obtain information from the stack of an interrupted thread. A "stack" is a region of reserved memory in which a program or programs store status data, such as procedure and function call addresses, passed parameters, and local variables. A "stack frame" is a portion of a thread's stack that represents local storage (arguments, return addresses, return values, and local variables) for a single function invocation. Every active thread of execution has a portion of system memory allocated for its stack space. A thread's stack could consist of sequences of stack frames. The set of frames on a thread's stack could represent the state of execution of that thread at any time. Many operating systems provide software timer interrupts useful to profilers. These timer interrupts can be employed to sample information from a call stack.

In a multitasking system, threads can be queued before the threads are executed. One technique for queuing threads is to maintain a single, centralized queue that may be referred to generically as a "run queue." If a processor becomes available, the next available thread is assigned from the run queue to the processor.

In some multi-processor systems, queuing threads may be accomplished by maintaining separate queues for each processor. Thus, when a thread is created, it could be assigned to a processor in a round robin fashion. With such a technique, some processors may become overloaded while other processors are relatively idle. Furthermore, some low priority threads may become starved, i.e. not provided with enough processing time, because higher priority threads are added to the run queue of the processor for which the low priority threads are waiting.

Previous sample-based profiling systems collected data relating to a specific process the processor was executing during each scheduled interruption of a process. Such profilers provided no data or limited data on a process that was runnable but not running when the interruption occurred. Runnable but not running means that the only resource the process is waiting on is the CPU itself. Such previous profiling systems are limited in the ability to determine whether a process is starved of processor time. Thus, there is a need for an apparatus and method for profiling processes are runnable but not running in a multithreaded environment.

SUMMARY OF THE INVENTION

An embodiment of the present invention is a computer program in a computer readable medium for profiling a multithreaded system. The computer program has first instructions for interrupting the operation of an application running in a multithreaded system. Second instructions identify, for a desired process, if this process is runnable but not running. Third instructions increment a counter for the process, signifying that it was runnable but not running, or signifying a function of the process was running. In an embodiment, the computer program loops for a predetermined amount of time or until otherwise interrupted. An embodiment includes instructions for generating a report summarizing function counts to allow developers the ability to see function characteristics including which functions may be starved of processor time.

Another embodiment is a method for profiling a multithreaded process after identifying a process to be profiled. Instructions are executed on a processor in a multithreaded manner and the executing of instructions is interrupted. A determination is made of whether the process is runnable but not running and a counter is incremented for the process if the process is runnable but not running.

Another embodiment is a data processing system for processing a multithreaded application. A profiler system waits a predetermined period of time, interrupts the processing of the multithreaded application, identifies a thread that is runnable but not running, and increments a counter for the thread that is runnable but not running. The multithreaded application is restarted and a report is generated summarizing the value of the counter.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The present invention can be used to profile process starvation for processes operating in a multithreaded environment. For a more complete understanding of the present invention and the advantages thereof, reference is now made to the following descriptions taken in conjunction with the accompanying drawings, in which.

DETAILED DESCRIPTION

Figure 1:
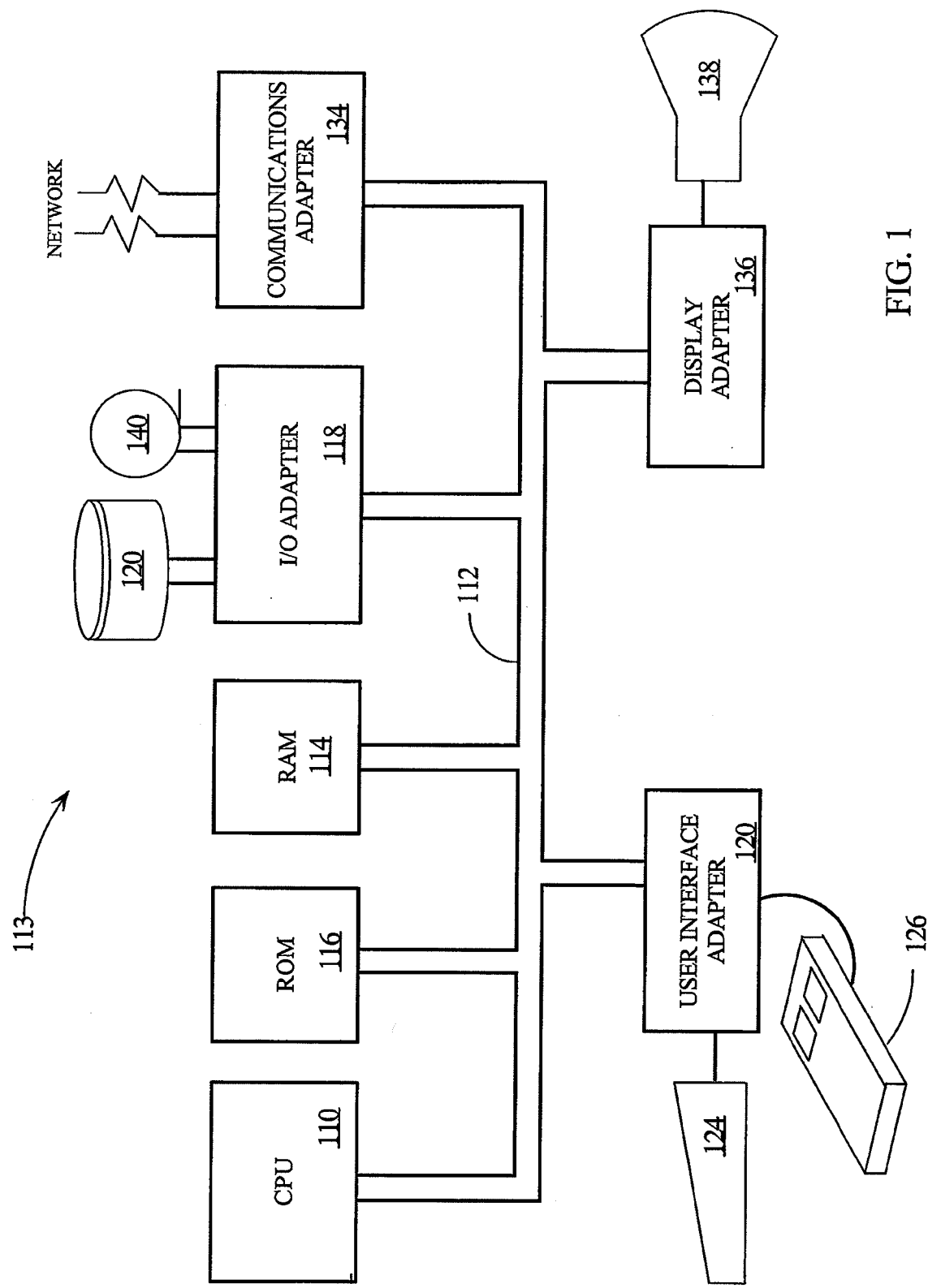
FIG. 1 illustrates a representative hardware environment for practicing the present invention.

In the following description, numerous specific details are shown in flow diagrams to provide a thorough understanding of the present invention. However, it will be obvious to those skilled in the art that the present invention may be practiced without such specific details. In other instances, well-known circuits, software, and hardware functions have been summarized as flow chart elements in order not to obscure the present invention in unnecessary detail. For the most part, details concerning software encoding and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates a representative hardware environment for practicing the present invention. An exemplary hardware configuration of data processing system 113 is shown having central processing unit (CPU) 110, such as a conventional microprocessor, and a number of other units interconnected via system bus 112. Data processing system 113 could include random access memory (RAM) 114, read only memory (ROM) 116, and input/output (I/O) adapter 118 for connecting peripheral devices such as disk units 120 and tape drives 140 to bus 112. Data processing system 113 could include user interface adapter 120 for connecting keyboard 124, mouse 126, and/or other user interface devices such as a touch screen device (not shown) to bus 112. Further, processing system 113 could include communications adapter 134 for connecting data processing system 113 to a data processing network, and display adapter 136 for connecting bus 112 to display device 138. CPU 110 may include other circuitry not shown herein, which will include circuitry commonly found within a microprocessor, e.g., execution unit, bus interface unit, arithmetic logic unit, etc. CPU 110 may also reside on a single integrated circuit. Communications adapter 134 could be any network adapter such as an Ethernet adapter. Disk unit 120 could be any computable readable medium and could be used for storing a computer program embodiment in conjunction with the present invention.

Figure 2:
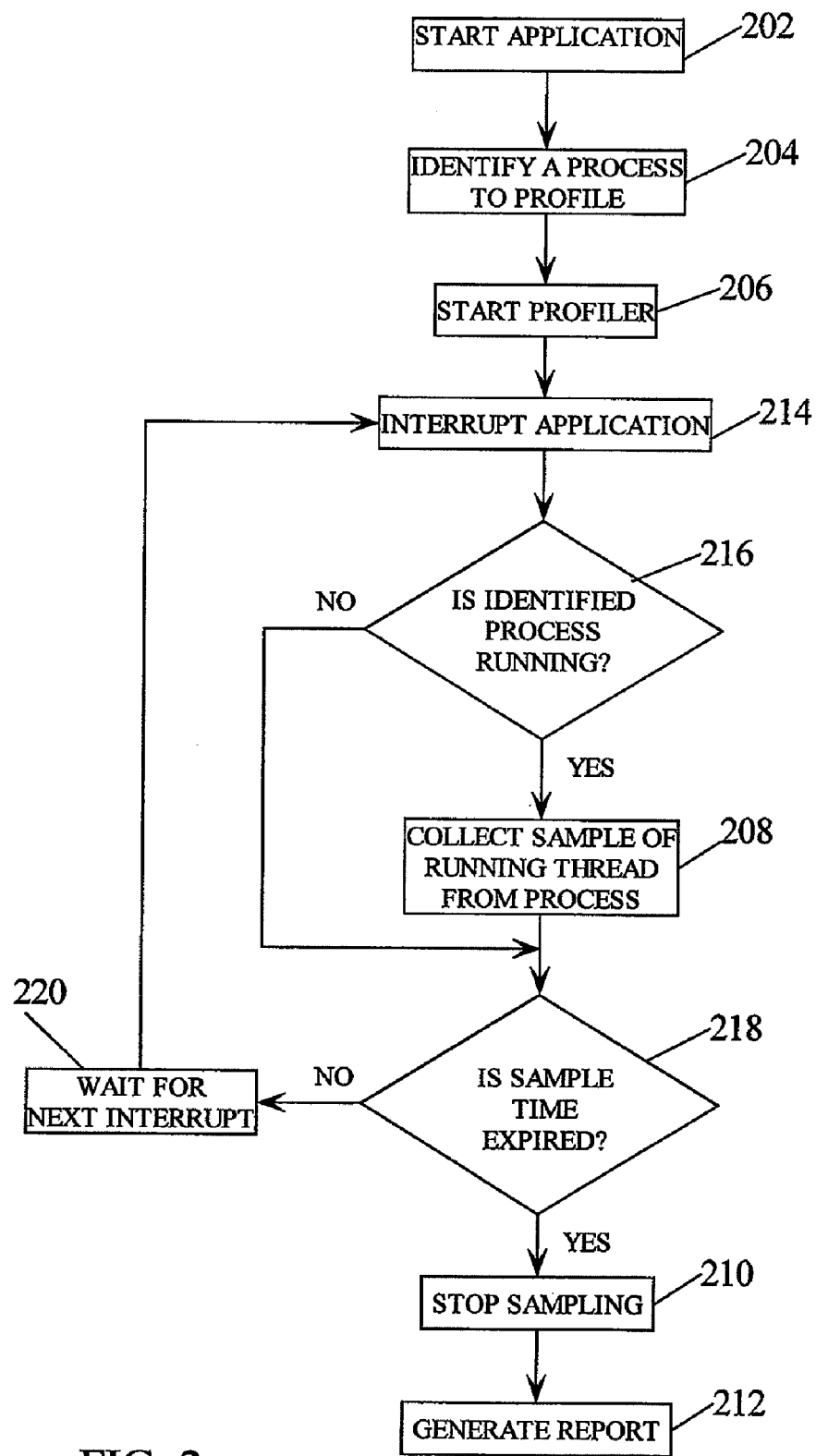
FIG. 2 is a flow chart illustrating steps in a profiler.

FIG. 2 illustrates profiling steps taken by a profiler. First, an application is started in step 202 for executing on CPU 110. In step 204, the developer identifies to the operating system (OS) a specific process, for example process "ABC," in need of profiling. Process ABC may include function_A, function_B, and function_C, for example. In step 206, the developer starts the profiler and then in step 214 the profiler interrupts the application after a predetermined period or after the occurrence of some event. In step 216, the profiler then determines whether process ABC was running at the time processing on CPU 110 was stopped. If process ABC was running function_A, for example, then in step 208 the profiler collects samples for function_A. If process ABC was not running when CPU 110 was interrupted, then a determination is made in step 218 whether the time for sampling has expired. If the time for sampling has not expired, then in step 220, the profiler waits for a proper amount of time for the next interrupt and then loops through steps 214, 216, and 208 until a determination is made in step 218 that the time for sampling has expired. When the time for sampling has expired, step 210 stops sampling and step 212 generates a report.

Figure 3:
FIG. 3 is an illustration of an example report generated by a profiler.

FIG. 3 is an illustration of a report 300 that might be generated in step 212 of FIG. 2. The report 300 could inform a software developer how much processor time was spent on function_A, function_B, and function_C. The report 300 generated by the profiler might indicate on line 302 that function_A had 50 hits, on line 304 that function_B had 25 hits, and on line 306 that function_C had 25 hits. A hit would be indicated by the value of the counter for that function. If the software developer expected each function to share the processor equally, the report 300 might cause the software developer concern because the processor appears to have executed function_A 50% of the time and remainder of time was split equally between function_B and function_C. The software developer would likely investigate further to determine why function_A was receiving twice as much processor time as each of function_B and function_C. Profiling as described in this paragraph is useful, but such profiling may be deficient for determining information on functions, threads, or processes that were not running when the CPU 110 was stopped. Further, in the above scenario the software developer might mistakenly attempt optimization of function_A to achieve a better balance when the problem was with a parameter other than function_A. With such profilers, no sample is taken if process ABC is runnable but not running, which means that the process is ready to run, is not running, and is waiting for the processor rather than waiting for I/O, lock, or the like. To aid in software development, a method and apparatus are needed for profiling processes that are runnable but not running.

Figure 4:
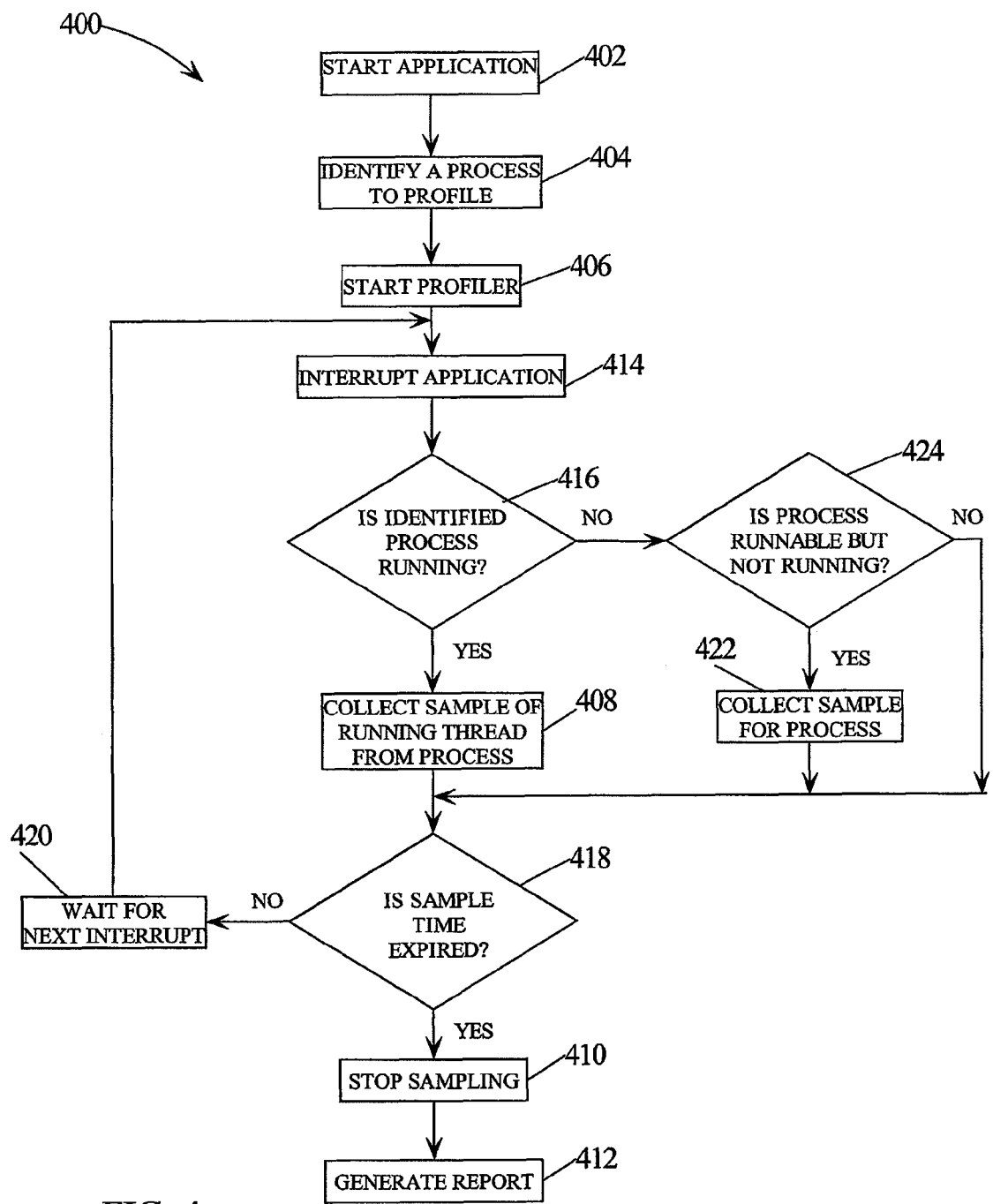
FIG. 4 is a flow chart illustrating steps performed by an embodiment of the present invention.

FIG. 4 illustrates profiling steps taken by an embodiment of the present invention. First, in step 402 an application is started on CPU 110 by profiler 400. In step 404, the developer identifies a specific process in need of profiling to the operating system. For example, the developer could instruct that process ABC is in need of profiling. Process ABC includes function_A, function_B, and function_C. The developer in step 406 starts the profiler and then in step 414 the profiler interrupts the application after a predetermined period or after the occurrence of some event. In step 416, the profiler determines whether process ABC is running and in step 408 the profiler collects samples for process ABC if the process is running. If process ABC is not running, the profiler in step 424 determines whether process ABC is runnable but not running. If process ABC is runnable but not running, the profiler in step 422 collects a sample and then cycles to step 418 for possible further profiling. If process ABC is waiting on I/O or is otherwise not runnable, the profiler cycles back to step 418 for further profiling without collecting a sample in step 422. In step 408, samples are collected if process ABC is running and in step 422 samples are collected if process ABC is runnable but not running. In step 420, the profiler 400 waits for the proper period for the next interrupt and then loops, as appropriate, through steps 414, 416, 408, 424, and 422 until a determination is made in step 418 that the time for sampling has expired. When the time for sampling is over, sampling is stopped in step 410 and a report is generated in step 412.

Figure 5:
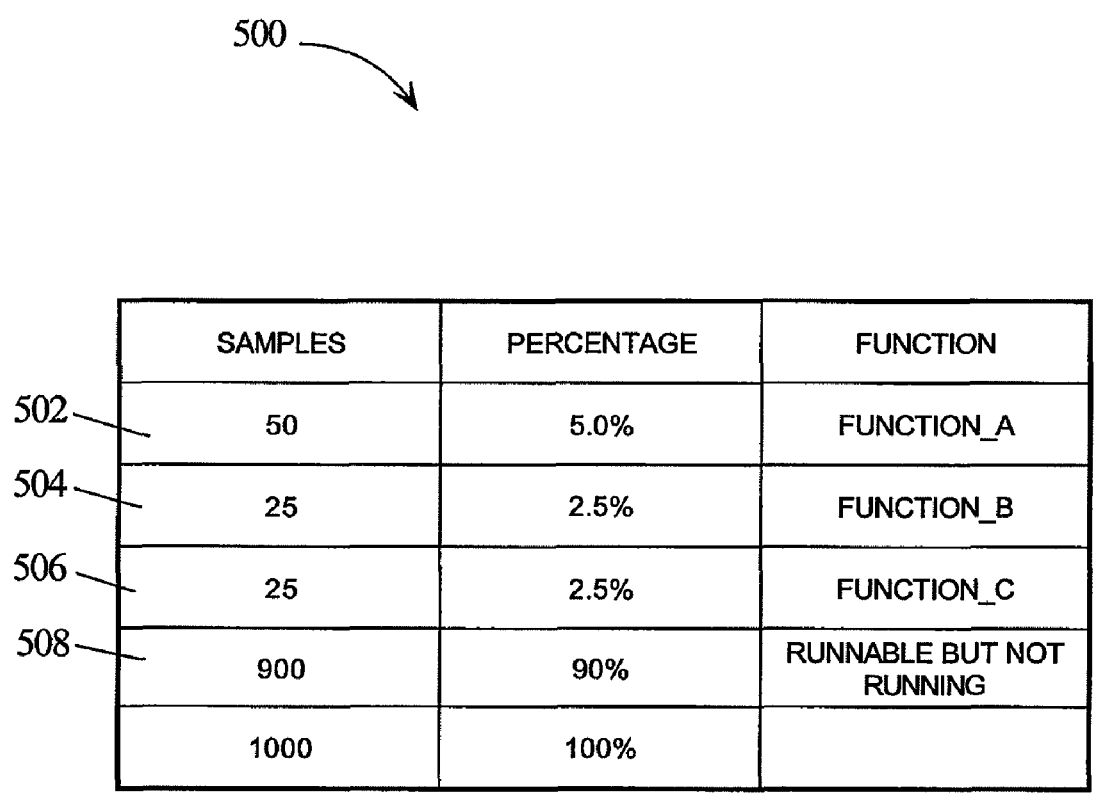
FIG. 5 is an illustration of an example report generated by an embodiment of the present invention.

FIG. 5 shows an example of a report 500 illustrating data generated by sampling as shown in FIG. 4. Data on line 502 represents that function_A from process ABC was running during 5% of the 1000 samples. Data on line 504 represents that function_B from process ABC was running during 2.5% of the samples. Likewise, data on line 506 represents that function_C was running during 2.5% of the samples. In an embodiment, data on line 508 represents that during 90% of samples taken, process ABC was runnable but not running. By collecting information on such processes that are runnable but not running, a developer can better determine how to optimize a process, application, or system. This method and apparatus of the present invention potentially prevents a developer from diving into an area for performance optimization where such optimization may not be needed. Using the technique described in FIG. 2, a developer might conclude that optimizing function_A, as shown in FIG. 3 will yield the most improvement. However, with the data from FIG. 5, if CPU starvation is observed, the prudent approach may be to solve the starvation problem before attempting to optimize function_A.

Figure 6:
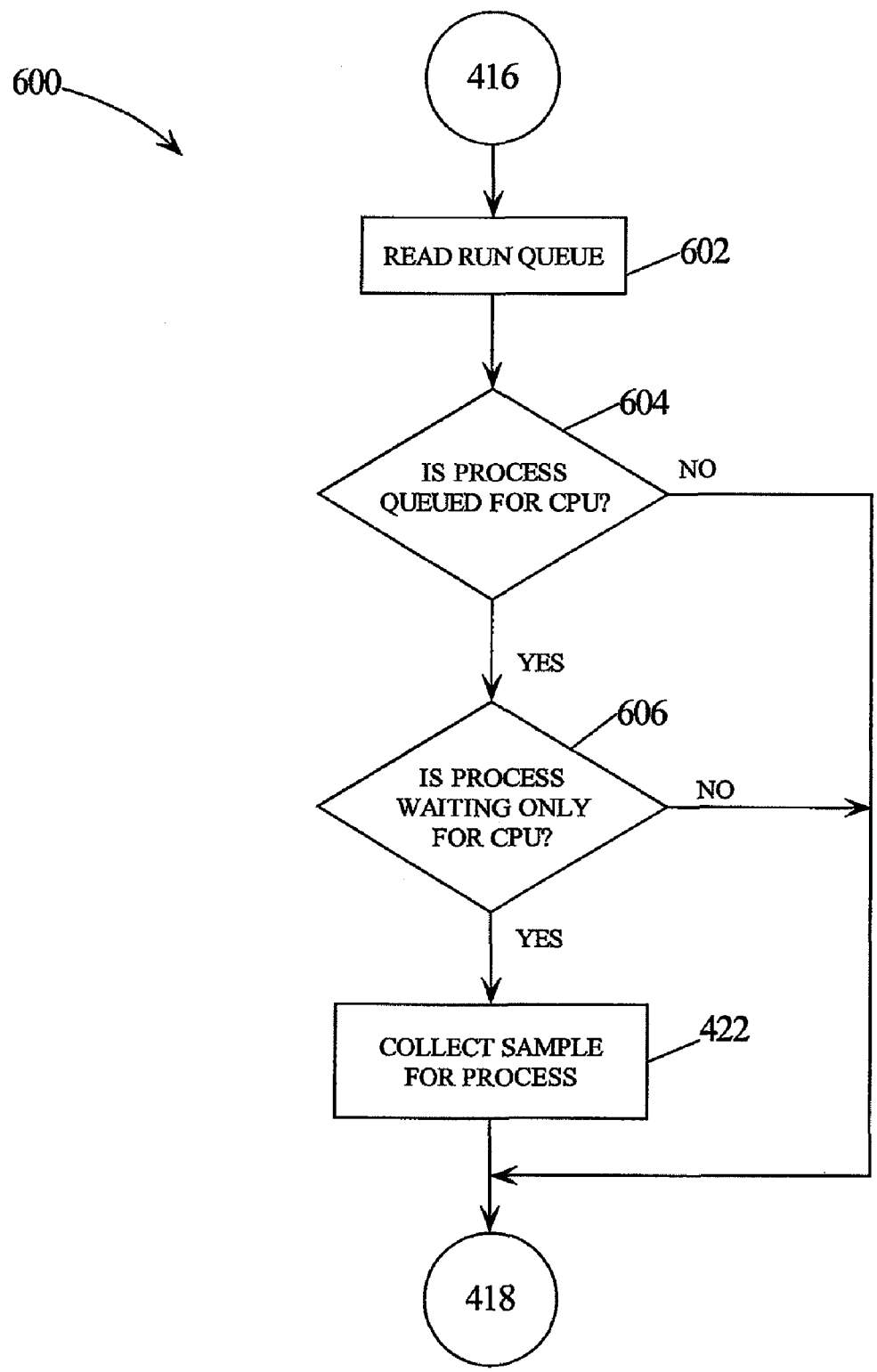
FIG. 6 is a flow chart illustrating an embodiment's steps for determining whether a task is runnable but not running.

FIG. 6 is a flow chart illustrating a methodology 600 for an embodiment profiler determining whether a process is runnable but not running. Methodology 600 could be incorporated into step 424 from FIG. 4. If the identified process in step 416 is not running at the time of interruption in step 414, the profiler reads the run queue in step 602. If a process is not queued for the CPU in step 604, in step 418 the profiler determines whether the time for sampling has expired. If the process is queued for the CPU in step 604, the profiler in step 606 determines whether the process is waiting only for the CPU or whether the process is waiting for I/O, lock, or some other event. If the process is queued for the CPU and waiting only for the CPU, a sample is collected and the process counter is incremented in step 422. In an alternate embodiment, the run queue can be read again in step 602 as necessary to look for any other process flagged for profiling. After determining whether a process is runnable but not running and sampling accordingly, the profiler returns to step 418 for determining whether the time for sampling has ended.

Although the present invention and its advantages have been described in detail, it should be understood that various changes, substitutions and alterations can be made herein without departing from the spirit and scope of the invention as defined by the appended claims.

What is claimed is:

1. A method for profiling a multithreaded process comprising the steps of:
    identifying a process to be profiled, wherein the process is one of a set of processes within instructions of an application;
    executing the instructions of the application on a processor in a multithreaded manner;
    interrupting the executing of the instructions of the application on the processor after a first predetermined time period within a time for sampling;

determining whether the process within the application was either running or runnable but not running upon interrupting the executing of the instructions of the application, wherein the process that is runnable but not running is a process that is not waiting on I/O and has yet to be executed;

responsive to the process within the application running upon interrupting the executing of the instructions of the application after the first predetermined time period, incrementing a value of a first counter for the process; and responsive to the process within the application being runnable but not running upon interrupting the executing of the instructions of the application after the first predetermined time period, incrementing a value of a second counter for the process, wherein the process comprises a plurality of functions and wherein the method further comprises the steps of:

assigning a set of separate counters for each function in the plurality of functions;

for each function in the plurality of functions of the process:

determining whether the function within the process was either running or runnable but not running upon interrupting the executing of the instructions of the application;

responsive to the function within the process running upon interrupting the executing of the instructions of the application after the predetermined time period, incrementing a value of a first counter for the function; and responsive to the function within the process being runnable but not running upon interrupting the executing of the instructions of the application after the predetermined time period, incrementing a value of a second counter for the function if the function was runnable but not running.

2. The method of claim 1 further comprising the steps of:
restarting the executing of the instructions of the application on the processor;
interrupting the executing of the instructions after a second predetermined period of time within the time for sampling;
responsive to the process within the application running upon interrupting the executing of the instructions of the application after the second predetermined time period, incrementing the value of the first counter for the process; and
responsive to the process within the application being runnable but not running upon interrupting the executing of the instructions of the application after the second predetermined time period, incrementing the value of the second counter for the process.

3. The method of claim 2 further comprising the step of:
generating a report summarizing the value of the first counter and the value of the second counter for the process at an end of the time for sampling and, for each function in the plurality of functions of the process, summarizing the value of the first counter and the second counter for the function at an end of the time for sampling.

4. The method of claim 1 wherein the step of executing instructions on a processor in a multithreaded manner comprises executing instructions on a plurality of processors in a multithreaded manner.

5. The method of claim 1 wherein the multithreaded process runs in a multitasking operating system and wherein the multithreaded process operates instructions on a single processor.

6. A computer program product comprising a non-transitory computer readable storage medium for profiling a multithreaded system, having a computer readable program stored therein, wherein the computer readable program, when executed on a computing device, causes the computing device to:

identifying a process to be profiled, wherein the process is one of a set of processes within instructions of an application;

executing the instructions of the application on a processor in a multithreaded manner;

interrupt the executing of the instructions of the application on the processor after a first predetermined time period within a time for sampling;

determining whether the process within the application was either running or runnable but not running upon interrupting the executing of the instructions of the application, wherein the process that is runnable but not running is a process that is not waiting on I/O and has yet to be executed;

responsive to the process within the application running upon interrupting the executing of the instructions of the application after the first predetermined time period, increment a value of a first counter for the process; and responsive to the process within the application being runnable but not running upon interrupting the executing of the instructions of the application after the first predetermined time period, increment a value of a second counter for the process, wherein the process comprises a plurality of functions and wherein the computer readable program further causes the computing device to:

assign a set of separate counters for each of the plurality of functions;

for each function in the plurality of functions of the process:

determining whether the function within the process was either running or runnable but not running upon interrupting the executing of the instructions of the application;

responsive to the function within the process running upon interrupting the executing of the instructions of the application after the predetermined time period, increment a value of a first counter for the function; and responsive to the function within the process being runnable but not running upon interrupting the executing of the instructions of the application after the predetermined time period, increment a value of a second counter for the function if the function was runnable but not running.

7. The computer program product of claim 6, wherein the computer readable program further causes the computing device to:

restart the executing of the instructions of the application on the processor;

interrupt the executing of the instructions after a second predetermined period of time within the time for sampling;

responsive to the process within the application running upon interrupting the executing of the instructions of the application after the second predetermined time period, increment the value of the first counter for the process; and responsive to the process within the application being runnable but not running upon interrupting the executing of the instructions of the application after the second predetermined time period, increment the value of the second counter for the process.

8. The computer program product of claim 7, wherein the computer readable program further causes the computing device to:
generate a report summarizing the value of the first counter and the value of the second counter for the process at an end of the time for sampling and, for each function in the plurality of functions of the process, summarizing the value of the first counter and the second counter for the function at an end of the time for sampling.

9. A data processing system comprising:
a processor;
a memory coupled to the processor, wherein the memory comprises instructions which, when executed by the processor, cause the processor to:
identify a process to be profiled, wherein the process is one of a set of processes within instructions of an application;
execute the instructions of the application on a multithreaded processor in a multithreaded manner;
interrupt the executing of the instructions of the application on the multithreaded processor after a first predetermined time period within a time for sampling;
determine whether the process within the application, was either running or runnable but not running upon interrupting the executing of the instructions of the application, wherein the process that is runnable but not running, is a process that is not waiting on I/O and has yet to be executed;
responsive to the process within the application running upon interrupting the executing of the instructions of the application after the first predetermined time period, incrementing a value of a first counter for the process; and
responsive to the process within the application being runnable but not running upon interrupting the executing of the instructions of the application after the first predetermined time period, increment a value of a second counter for the process, wherein the process comprises a plurality of functions and wherein the instructions further cause the processor to:
assign a set of separate counters for each of the plurality of functions;
for each function in the plurality of functions of the process:
determining whether the function within the process was either running or runnable but not running upon interrupting the executing of the instructions of the application;
responsive to the function within the process running upon interrupting the executing of the instructions of the application after the predetermined time period, increment a value of a first counter for the function; and
responsive to the function within the process being runnable but not running, upon interrupting the executing of the instructions of the application after the predetermined time period, increment a value of a second counter for the function if the function was runnable but not running.

10. The data processing system of claim 9, wherein the instructions further cause the processor to:
restart the executing of the instructions of the application on the multithreaded processor;
interrupt the executing of the instructions after a second predetermined period of time within the time for sampling;
responsive to the process within the application running upon interrupting the executing of the instructions of the application after the second predetermined time period, increment the value of the first counter for the process; and
responsive to the process within the application being runnable but not running upon interrupting the executing of the instructions of the application after the second predetermined time period, increment the value of the second counter for the process if the process was runnable but not running.

11. The data processing system of claim 10, wherein the instruction further cause the processor to:
generate a report summarizing the value of the first counter and the value of the second counter for the process at an end of the time for sampling and, for each function in the plurality of functions of the process, summarizing the value of the first counter and the second counter for the function at an end of the time for sampling.

* * * * *